United States Patent
Ku et al.

(10) Patent No.: US 11,229,054 B2
(45) Date of Patent: Jan. 18, 2022

(54) METHOD FOR FEEDBACK FOR DEVICE-TO-DEVICE COMMUNICATION IN WIRELESS COMMUNICATION SYSTEM, AND DEVICE FOR SAME

(71) Applicant: LG Electronics Inc., Seoul (KR)

(72) Inventors: Gwanmo Ku, Seoul (KR); Sangrim Lee, Seoul (KR); Hojae Lee, Seoul (KR); Hyukjin Chae, Seoul (KR); Sangwook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/761,024

(22) PCT Filed: Nov. 5, 2018

(86) PCT No.: PCT/KR2018/013303
§ 371 (c)(1),
(2) Date: May 1, 2020

(87) PCT Pub. No.: WO2019/088779
PCT Pub. Date: May 9, 2019

(65) Prior Publication Data
US 2020/0344808 A1      Oct. 29, 2020

Related U.S. Application Data

(60) Provisional application No. 62/582,248, filed on Nov. 6, 2017.

(51) Int. Cl.
*H04W 74/08* (2009.01)
*H04W 4/06* (2009.01)
*H04W 92/18* (2009.01)

(52) U.S. Cl.
CPC ......... *H04W 74/0825* (2013.01); *H04W 4/06* (2013.01); *H04W 92/18* (2013.01)

(58) Field of Classification Search
CPC ................ H04W 4/06; H04W 4/70; H04W 74/0808–0858
See application file for complete search history.

(56) References Cited

U.S. PATENT DOCUMENTS

| | | | |
|---|---|---|---|
| 2014/0086152 A1* | 3/2014 | Bontu | H04W 4/70 370/329 |
| 2015/0208401 A1* | 7/2015 | Lu | H04W 72/0406 455/452.1 |

(Continued)

FOREIGN PATENT DOCUMENTS

| KR | 20140068088 A | 6/2014 |
|---|---|---|
| KR | 20160116333 A | 10/2016 |

(Continued)

*Primary Examiner* — Pao Sinkantarakorn
(74) *Attorney, Agent, or Firm* — Dentons US LLP

(57) ABSTRACT

The method for feedback for broadcast- or multicast-based device-to-device communication in a wireless communication system, according to one embodiment of the present disclosure, is performed by a first terminal and may comprise the steps of: determining whether or not a collision has occurred in data received from a counterpart terminal; and in response to the determination that a collision has occurred, transmitting feedback information, including collision resource information and terminal operation information, to the counterpart terminal.

14 Claims, 11 Drawing Sheets

(56) References Cited

U.S. PATENT DOCUMENTS

2016/0100412 A1* 4/2016 Shin ................... H04W 76/23
   370/336
2016/0295603 A1* 10/2016 Li ..................... H04W 28/04
2018/0220463 A1* 8/2018 Fodor ............... H04W 74/0825

FOREIGN PATENT DOCUMENTS

| WO | 2015126115 A1 | 8/2015 |
| WO | 2016018009 A1 | 2/2016 |
| WO | 2017179922 A2 | 10/2017 |

* cited by examiner

METHOD FOR FEEDBACK FOR DEVICE-TO-DEVICE COMMUNICATION IN WIRELESS COMMUNICATION SYSTEM, AND DEVICE FOR SAME

This application is the National Stage filing under 35 U.S.C. 371 of International Application No. PCT/KR2018/013303, filed on Nov. 5, 2018, which claims the benefit of U.S. Provisional Application No. 62/582,248 filed on Nov. 6, 2017, the contents of which are all hereby incorporated by reference herein in their entirety.

TECHNICAL FIELD

The present disclosure relates to a wireless communication system, and more particularly, to a feedback method for device-to-device (D2D) communication and device therefor.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide a feedback method for device-to-device (D2D) communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a feedback method for device-to-device (D2D) communication based on broadcast or multicast in a wireless communication system, which is performed by a first user equipment (UE). The method may include: determining whether a collision occurs in data received from a peer UE and transmitting feedback information including collision resource information and UE behavior information to the peer UE when it is determined that that the collision occurs.

Additionally or alternatively, the feedback information may be transmitted when the quality or strength of a signal received from the peer UE is greater than or equal to a threshold, when the first UE belongs to a specific UE group, or when the first UE has data to transmit.

Additionally or alternatively, the collision resource information may include a frequency resource location or a collision interval.

Additionally or alternatively, the UE behavior information may include an indicator indicating all UEs, a period, a priority, a latency budget, or information indicating a specific UE. The period and the priority may be respectively selected from among periods and priorities included in control information received by the first UE, and the specific UE may be determined by the first UE according to a predetermined standard/criterion.

Additionally or alternatively, the method may include receiving, from a base station, a feedback trigger configuration including a resource pool for the D2D communication, feedback channel information, and feedback assistant information. The feedback assistant information may include a condition for determining whether the first UE performs feedback.

In another aspect of the present disclosure, provided is a feedback method for D2D communication based on broadcast or multicast in a wireless communication system, which is performed by a first UE. The method may include: receiving feedback information on data received by a peer UE, wherein the feedback information may include collision resource information and UE behavior information, determining whether a collision occurs in (the?) data transmitted by the first UE based on the received feedback information, and performing retransmission of the data based on the received feedback information when it is determined that the collision occurs in the data.

Additionally or alternatively, when a resource used by the first UE to transmit the data is equivalent to the collision resource information, it may be determined that the collision occurs in the data transmitted by the first UE.

Additionally or alternatively, the method may include retransmitting the data on the resource without autonomous resource selection when the received feedback information includes a period, a priority, or a latency budget configured for the first UE through a control signal or information for identifying the first UE and retransmitting the data on a resource based on the autonomous resource selection in a resource pool except the resource when the received feedback information includes neither the period, the priority, or the latency budget configured for the first UE through the control signal nor the information for identifying the first UE.

Additionally or alternatively, the collision resource information may include a frequency resource location or a collision interval.

Additionally or alternatively, the UE behavior information may include an indicator indicating all UEs, a period, a priority, a latency budget, or information indicating a specific UE. The period and the priority may be respectively selected from among periods and priorities included in control information received by the first UE, and the specific UE may be determined by the first UE according to a predetermined standard.

In still another aspect of the present disclosure, provided is a UE for performing feedback for D2D communication based on broadcast or multicast in a wireless communication system. The UE may include a transmitter, a receiver, and a processor configured to control the transmitter and the receiver. The processor may be configured to determine whether a collision occurs in data received from a peer UE and transmit feedback information including collision resource information and UE behavior information to the peer UE when it is determined that the collision occurs.

Additionally or alternatively, the feedback information may be transmitted when quality or strength of a signal received from the peer UE is greater than or equal to a threshold, when the UE belongs to a specific UE group, or when the UE has data to transmit.

Additionally or alternatively, the collision resource information may include a frequency resource location or a collision interval. The UE behavior information includes an indicator indicating all UEs, a period, a priority, a latency budget, or information indicating a specific UE. The period and the priority may be respectively selected from among periods and priorities included in control information received by the UE, and the specific UE may be determined by the UE according to a predetermined standard.

Additionally or alternatively, the processor may be configured to receive, from a base station, a feedback trigger configuration including a resource pool for the D2D communication, feedback channel information, and feedback assistant information. The feedback assistant information may include a condition for determining whether the UE performs feedback.

In a further aspect of the present disclosure, provided is a UE for receiving feedback for D2D communication based on broadcast or multicast in a wireless communication system. The UE may include a transmitter, a receiver, and a processor configured to control the transmitter and the receiver. The processor may be configured to receive feedback information on data received by a peer UE, wherein the feedback may include collision resource information and UE behavior information, determine whether a collision occurs in data transmitted by the UE based on the received feedback information, and perform retransmission of the data based on the received feedback information when it is determined that the collision occurs in the data.

Additionally or alternatively, when a resource used by the UE to transmit the data is equivalent to the collision resource information, it may be determined that the collision occurs in the data transmitted by the UE.

Additionally or alternatively, the processor may be configured to retransmit the data on the resource without autonomous resource selection when the received feedback information includes a period, a priority, or a latency budget configured for the UE through a control signal or information for identifying the UE and retransmit the data on a resource based on the autonomous resource selection in a resource pool except the resource when the received feedback information includes neither the period, the priority, or the latency budget configured for the UE through the control signal nor the information for identifying the UE Additionally or alternatively, the collision resource information may include a frequency resource location or a collision interval. The UE behavior information may include an indicator indicating all UEs, a period, a priority, a latency budget, or information indicating a specific UE. The period and the priority may be respectively selected from among periods and priorities included in control information received by the UE, and the specific UE may be determined by the UE according to a predetermined standard.

It is to be understood that both the foregoing general description and the following detailed description of the present disclosure are exemplary and explanatory and are intended to provide further explanation of the disclosure as claimed.

Advantageous Effects

According to embodiments of the present disclosure, a feedback report in device-to-device communication may be efficiently processed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

MODE FOR CARRYING OUT THE DISCLOSURE

Figure 1:
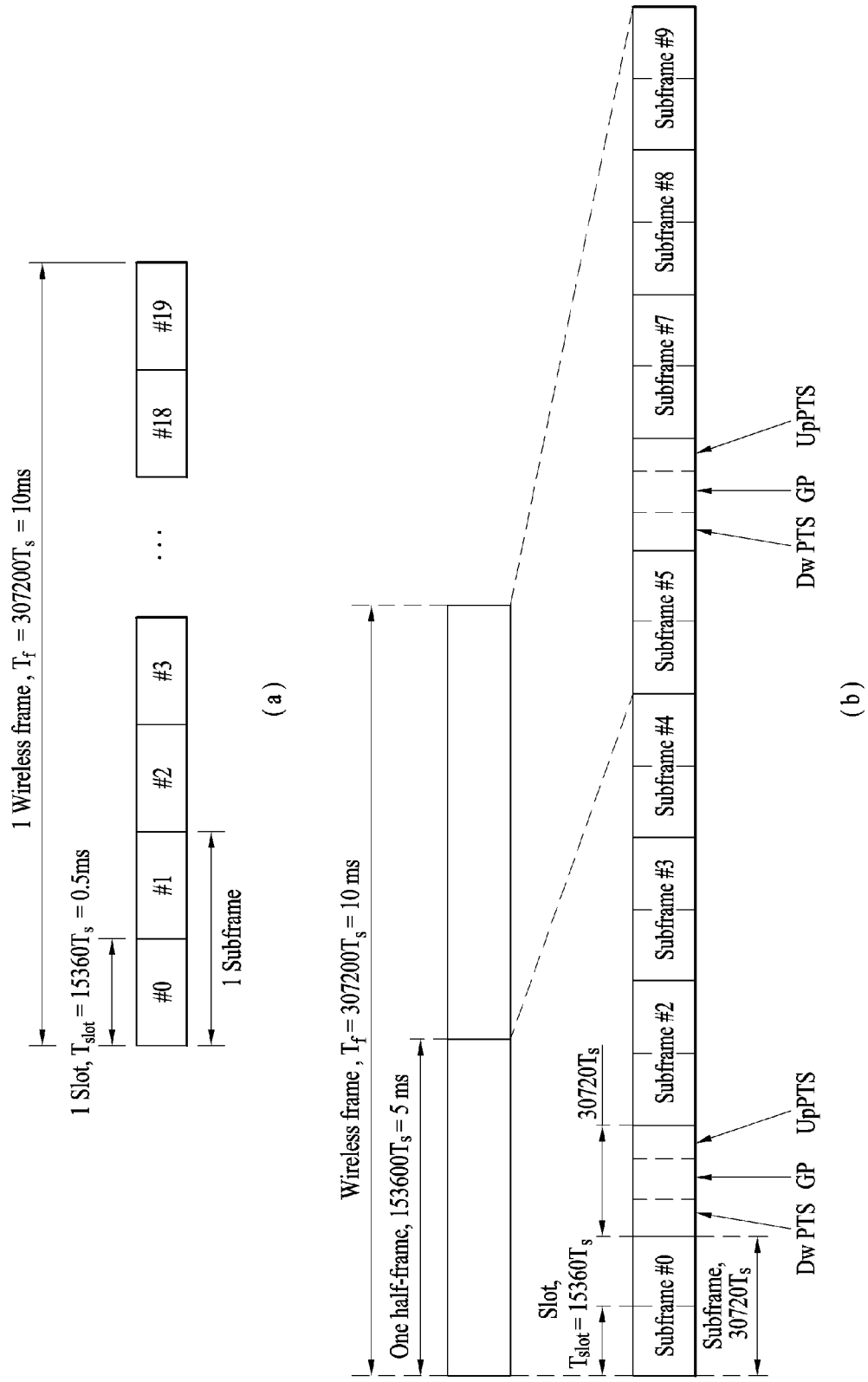
FIG. 1 illustrates the structure of a radio frame used in a wireless communication system.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system of the present disclosure, which will be described below, one or more eNBs or eNB controllers, connected to a plurality of nodes, may control the plural nodes to simultaneously transmit or receive signals to or from a UE through some or all of the plural nodes. Although there is a difference between multi-node systems according to the nature of each node and implementation form of each node, the multi-node systems are different from single-node systems (e.g. a CAS, a conventional MIMO system, a conventional relay system, a conventional repeater system, etc.), in that plural nodes participate in providing a communication service to a UE on a predetermined time-frequency resource. Accordingly, embodiments of the present disclosure regarding a method for performing cooperative data transmission using some or all of plural nodes may be applied to various types of multi-node systems. For example, while a node generally refers to an antenna group separated by a predetermined interval or more from another node, the embodiments of the present disclosure, which will be described later, may be applied even when a node means an arbitrary antenna group irrespective of how far the node is separated from another node. For example, when an eNB includes a cross polarized (X-pole) antenna, the embodiments of the present disclosure are applicable under the assumption that the eNB controls a node including a horizontally polarized (H-pole) antenna and a node including a vertically polarized (V-pole) antenna.

A communication scheme capable of transmitting/receiving a signal through a plurality of transmission (TX)/reception (RX) nodes, transmitting/receiving a signal through at least one node selected from among a plurality of TX/RX nodes, or differentiating a node transmitting a downlink signal from a node receiving an uplink signal is referred to as multi-eNB MIMO or coordinated multi-point TX/RX (CoMP). A coordinated transmission scheme of such coordinated communication between nodes may be classified largely into joint processing (JP) and scheduling coordination (CB). The JP scheme may further be divided into joint transmission (JT) and dynamic point selection (DPS) and the CB scheme may further be divided into coordinated scheduling (CS) and coordinated beamforming (CB). DPS may also be called dynamic cell selection (DCS). When JP is performed compared with other communication schemes among coordination communication schemes between nodes, a wider variety of communication environments may be formed. JT of the JP scheme is a communication scheme for transmitting the same stream to a UE from a plurality of nodes. The UE restores the stream by combining signals received from the plural nodes. JT can improve reliability of signal transmission using transmit diversity because the same stream is transmitted by plural nodes. DPS of the JP scheme is a communication scheme for transmitting/receiving a signal through one node selected according to a specific rule from among a plurality of nodes. In DPS, since a node having a good channel state with a UE will typically be selected as a communication node, reliability of signal transmission can be improved.

Meanwhile, in the present disclosure, a cell refers to a prescribed geographical area to which one or more nodes provide a communication service. Accordingly, in the present disclosure, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that at least one of CSI-RS resource configuration which specify symbols and subcarriers carrying the CSI-RSs, subframe configuration which specify subframes, to which CSI-RSs are allocated, by using subframe offset, transmission period and etc., and/or CSI-RS sequence is different from each other.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
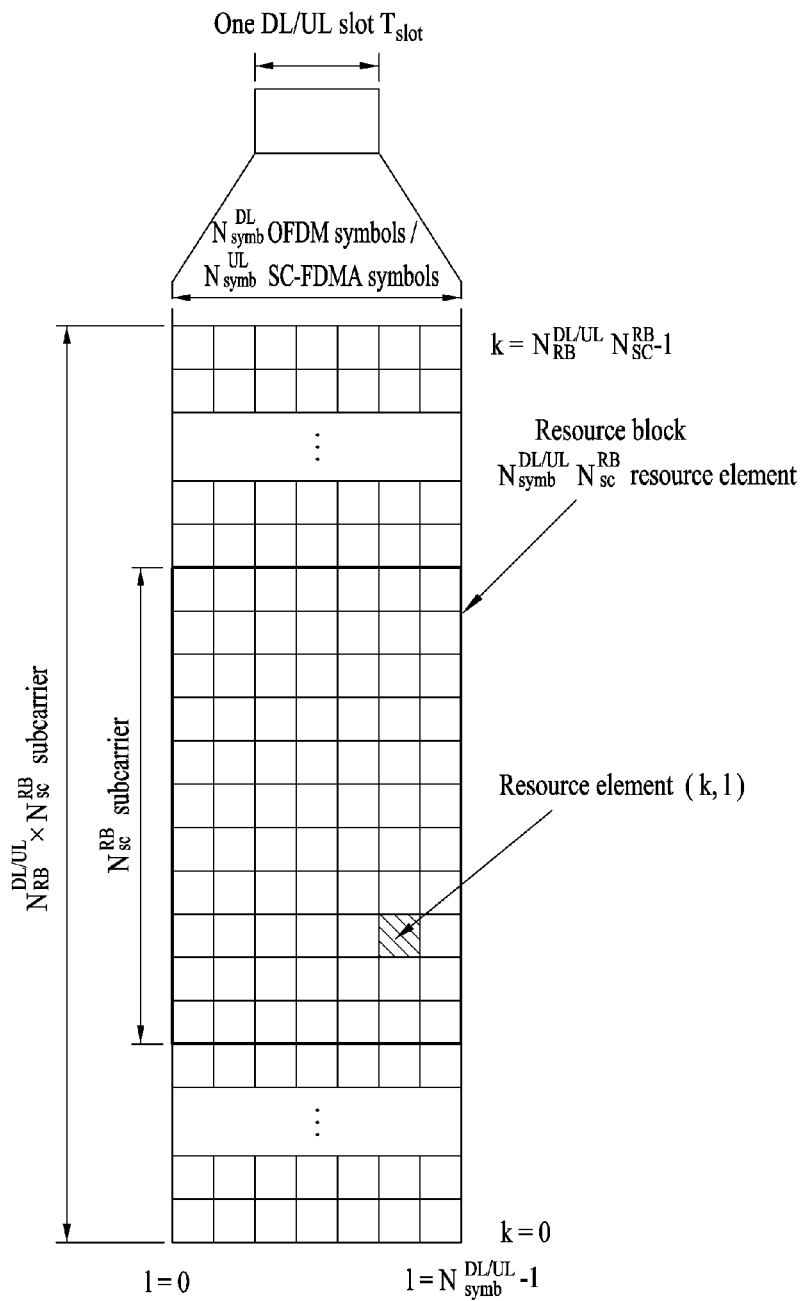
FIG. 2 illustrates the structure of a downlink/uplink (DL/UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present disclosure are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs each located in two slots of the subframe while occupying the same NRBsc consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes nPRB=nVRB. Numbers ranging from 0 to NDL-PRB−1 are assigned to the VRBs of the localized type and NDLVRB=NDLRB. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 3:
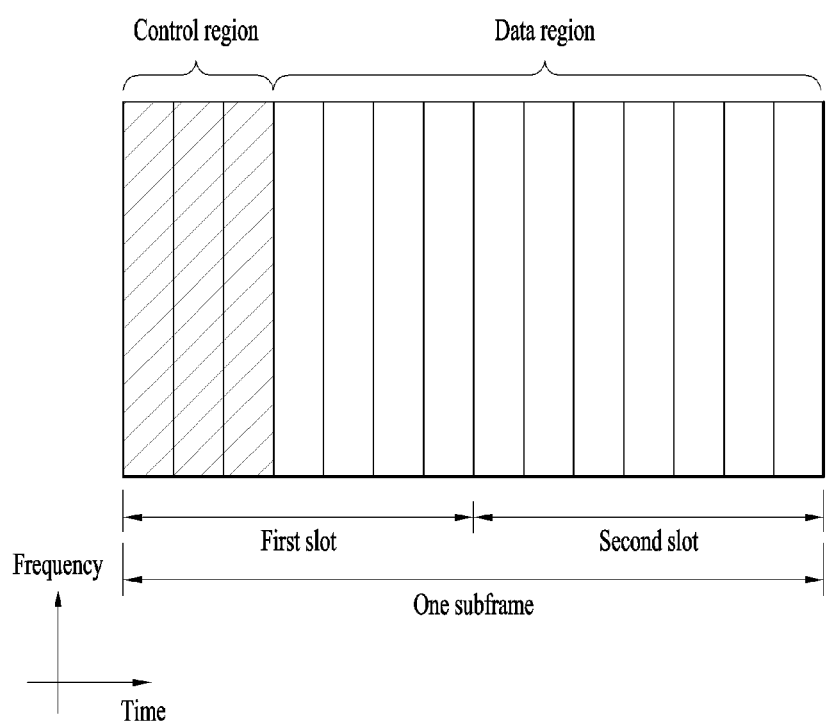
FIG. 3 illustrates the structure of a downlink (DL) subframe used in the 3GPP LTE/LTE-A system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

Control information transmitted on a PDCCH is referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive Control Channel Elements (CCEs). A CCE is a logical allocation unit used to provide a PDCCH at a coding rate based on the state of a radio channel A CCE corresponds to a plurality of resource element groups (REGs). For example, one CCE corresponds to 9 REGs and one REG corresponds to 4 REs. 3GPP LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of user equipments. The common search space is configured for a plurality of UEs. Aggregation levels for defining the search space are shown in the following.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (or blind decoding) (BD).

An eNB can transmit data for a UE or a UE group via a data region. The data transmitted via the data region is referred to as a user data. In order to transmit the user data, PDSCH (physical downlink shared channel) can be assigned to the data region. PCH (paging channel) and DL-SCH (downlink-shared channel) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a CRS together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE (-A), an additional RS for measuring a channel, i.e., a CSI-RS, is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 4:
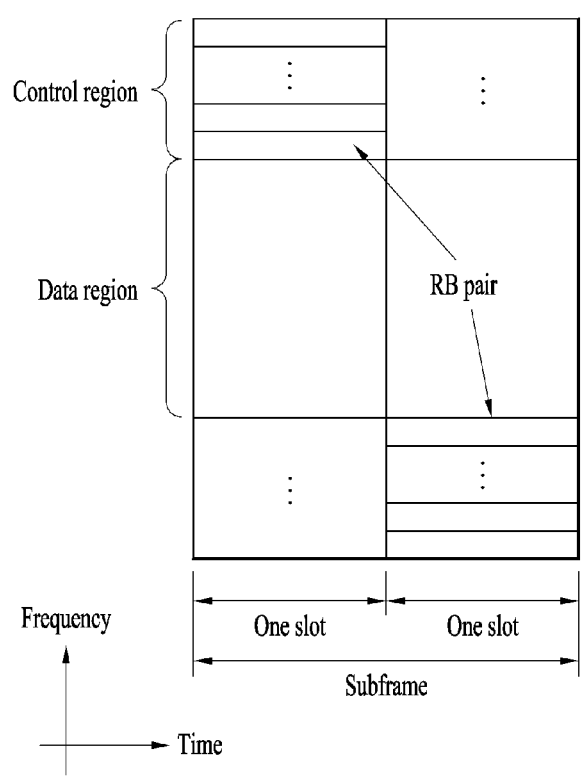
FIG. 4 illustrates the structure of an uplink (UL) subframe used in the 3GPP LTE/LTE-A system.

FIG. 4 is a diagram for an example of an uplink (UL) subframe structure used in 3GPP LTE/LTE-A system.

Referring to FIG. 4, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data.

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency $f_0$ in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.

CSI (channel state information): Feedback information on a DL channel MIMO (multiple input multiple output)-related feedback information includes an RI (rank indicator) and a PMI (precoding matrix indicator).

The amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH format 1 is mainly used for transmitting ACK/NACK and PUCCH format 2 is mainly used for transmitting channel state information (CSI) such as CQI/PMI/RI, and PUCCH format 3 is mainly used for transmitting ACK/NACK information.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and vi) a positioning reference signal used to estimate geographic position information of the user equipment.

The RSs may be broadly divided into two reference signals according to the purposes thereof. One is used to acquire channel information and the other is used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

New Radio Technology (NR)

Hereinbelow, a new radio access technology system will be described. As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other has also been required. Moreover, design of a communication system considering services/UEs sensitive to reliability and latency has been proposed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

The NR system to which the present disclosure is applicable supports various OFDM numerologies shown in the following table. In this case, the value of µ and cyclic prefix information per carrier bandwidth part may be signaled for each of DL and UL. For example, the value of µ and cyclic prefix information per DL carrier bandwidth part may be signaled though DL-BWP-mu and DL-MWP-cp corresponding to higher layer signaling. As another example, the value of µ and cyclic prefix information per UL carrier bandwidth part may be signaled though UL-BWP-mu and UL-MWP-cp corresponding to higher layer signaling.

TABLE 5

| µ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A frame structure in NR will now be described. For DL and UL transmission, a frame having a length of 10 ms is configured. The frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each subframe may be composed of two half-frames with the same size. In this case, the two half-frames are composed of subframes 0 to 4 and subframes 5 to 9, respectively.

Regarding the subcarrier spacing µ, slots may be numbered within one subframe in ascending order like and may also be numbered within one frame in ascending order like. In this case, the number of consecutive OFDM symbols ( ) in one slot may be determined as shown in the following table according to the cyclic prefix. The start slot ( ) of one subframe is aligned with the start OFDM symbol ( ) of the same subframe in the time dimension. Table 6 below shows the number of OFDM symbols in each slot/frame/subframe in the case of a normal cyclic prefix, and Table 7 below shows the number of OFDM symbols in each slot/frame/subframe in the case of an extended cyclic prefix.

TABLE 6

| µ | $N_{symb}^{slot}$ | $N_{slot}^{frame\ \mu}$ | $N_{slot}^{subframe\ \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 7

| µ | $N_{symb}^{slot}$ | $N_{slot}^{frame\ \mu}$ | $N_{slot}^{subframe\ \mu}$ |
|---|---|---|---|
| 2 | 12 | 40 | 4 |

In the NR system to which the present disclosure is applicable, a self-contained slot structure may be applied based on the above-described slot structure.

Figure 5:
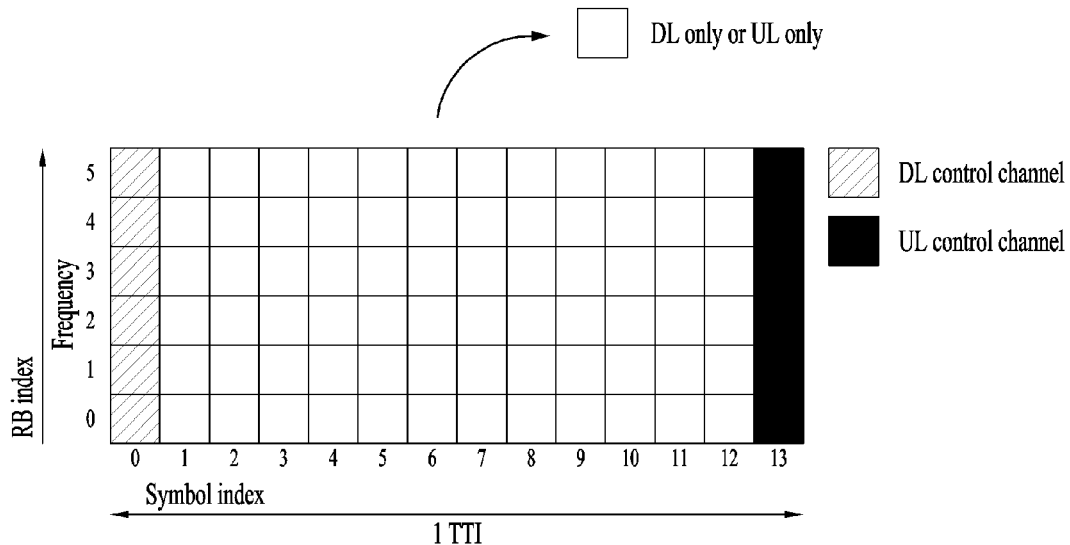
FIG. 5 is a diagram illustrating a self-contained subframe structure in the NR wireless communication system.

FIG. 5 is a reference diagram for explaining a self-contained slot structure applicable to the present disclosure.

In FIG. 5, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, the eNB and UE may sequentially perform DL transmission and UL transmission in one slot. That is, the eNB and UE may transmit and receive DL data and UL ACK/NACK in response to the DL data in one slot. Consequently, due to such a structure, it is possible to reduce a time required until data retransmission in the case in which a data transmission error occurs, thereby minimizing the latency of final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Figure 8:
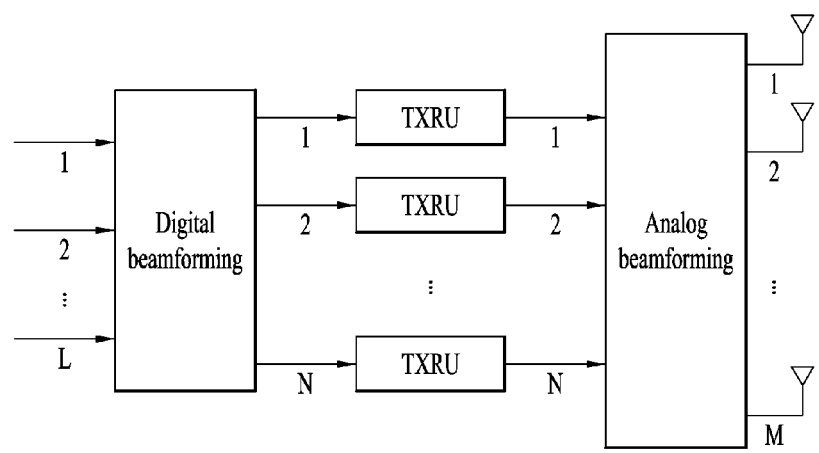
FIG. 8 is a diagram schematically illustrating an exemplary hybrid beamforming structure.

Although the case in which the self-contained slot structure includes both the DL and UL control regions has been described above, these control regions may be selectively included in the self-contained slot structure. In other words, the self-contained slot structure according to the present disclosure may include either the DL control region or the UL control region as well as both the DL and UL control regions as illustrated in FIG. 8.

For example, the slot may have various slot formats. In this case, OFDM symbols in each slot may be divided into DL symbols (denoted by 'D'), flexible symbols (denoted by 'X'), and UL symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

Hereinafter, analog beamforming will be described.

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 6:
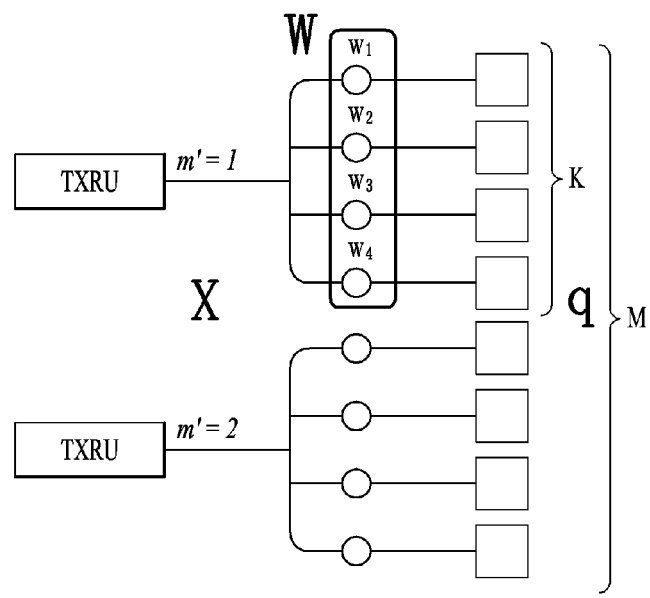
FIGS. 6 and 7 are diagrams illustrating representative methods for connecting transceiver units (TXRUs) to antenna elements.
Figure 7:
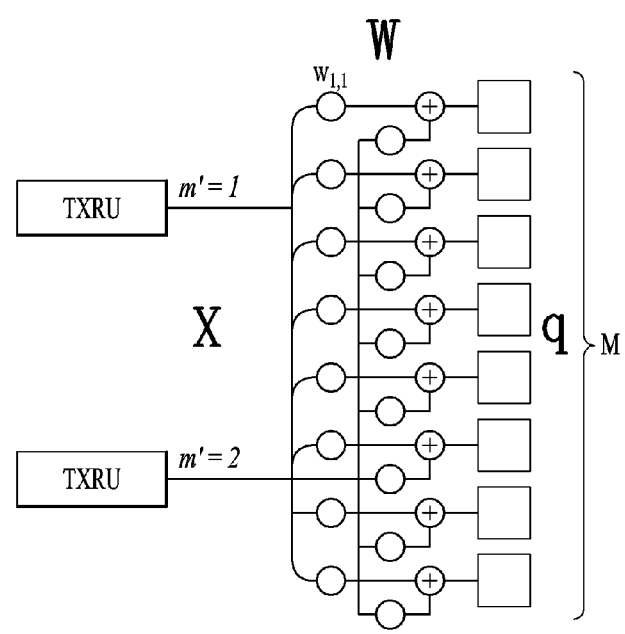

FIGS. 6 and 7 are diagrams illustrating representative methods for connecting TXRUs to antenna elements. Here, the TXRU virtualization model represents the relationship between TXRU output signals and antenna element output signals.

FIG. 6 illustrates a method for connecting TXRUs to sub-arrays. In FIG. 6, an antenna element is connected to only one TXRU.

Meanwhile, FIG. 7 illustrates a method for connecting all TXRUs to all antenna elements. In FIG. 7, an antenna element is connected to all TXRUs. In this case, separate addition units are required to connect an antenna element to all TXRUs as illustrated in FIG. 7.

In FIGS. 6 and 7, W indicates a phase vector weighted by an analog phase shifter. That is, W is a main parameter determining the direction of analog beamforming. In this case, the mapping relationship between CSI-RS antenna ports and TXRUs may be 1:1 or 1-to-many.

The configuration illustrated in FIG. 6 has a disadvantage in that it is difficult to achieve BF focusing but has an advantage in that all antennas may be configured at low cost.

The configuration illustrated in FIG. 7 is advantageous in that beamforming focusing may be easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF is advantageous in that it guarantees performance similar to digital BF while reducing the number of RF chains and digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

FIG. 8 is a schematic diagram illustrating a hybrid BF structure from the perspective of TXRUs and physical antennas. In FIG. 8, the number of digital beams is L and the number of analog beams is N.

Additionally, a method for providing efficient BF to UEs located in a specific area by designing an eNB capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the eNB uses a plurality of analog beams as described above, each UE has a different analog beam suitable for signal reception. Thus, a beam sweeping operation in which the eNB transmits signals (at least synchronization signals, system information, paging, etc.) by applying a different analog beam to each symbol in a specific subframe in order to allow all UEs to have reception opportunities has been considered in the NR system to which the present disclosure is applicable.

In addition to periodic/aperiodic CSI reporting, semi-persistent CSI reporting is also considered in the NR system. The semi-persistent CSI reporting may be activated or deactivated.

For CSI reporting, Type I feedback and Type II feedback are supported. For the Type II, Category 1, 2, and/or 3 may be configured. Categories 1, 2, and 3 correspond to precoder feedback based on a linear combination codebook, covariance matrix feedback, and hybrid CSI feedback, respectively. For the hybrid CSI feedback, a scheme of using Category 1 or 2 in conjunction with LTE-Class-B-type-like CSI feedback is considered.

For the Type I and II feedback, CSI feedback per subband as well as partial band and/or wideband feedback may be supported. In addition, beam-related feedback may also be included. For CSI reporting for a component carrier, the following as least three different frequency granularities may be supported.

Wideband CSI
Partial band CSI
Subband CSI

For CSI-RS transmission and CSI reporting, the following combinations may be supported.

TABLE 8

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command (MAC CE); for reporting on PUSCH, the UE receives triggering on DCI | Triggered by DCI; additionally, activation command (MAC CE) |
| Semi-Persistent CSI-RS | Not Supported | For reporting on PUCCH, the UE receives an activation command (MAC CE); for reporting on PUSCH, the UE receives triggering on DCI | Triggered by DCI; additionally, activation command (MAC CE) |
| Aperiodic CSI-RS | Not Supported | Not Supported | Triggered by DCI; additionally, activation command (MAC CE) |

In conventional communication systems to which UE autonomous resource selection is applied, each UE randomly selects a resource for transmission in a predetermined resource pool, and as a result, there may be a collision if other UEs select the same resource. Such a collision may not guarantee reliable communication. In particular, for a specific service with strict reliability requirements (e.g., eV2X), retransmission needs to be performed in consideration of collision conditions, and collision avoidance also needs to be considered in resource reselection. In the prior art, it has been considered that duplicates are created for retransmission or a sensing/listening process is performed before resource selection. Although a retransmission scheme may increase the probability of successful transmission based on repeated transmission, it is incapable of preventing collisions. In addition, even when sensing or listening for checking occupied (used) resources before transmission is applied, if UEs are located as in a hidden node problem, the sensing may be disabled due to a coverage problem, and as a result, a UE receiving signals from both sides, i.e., a receiving UE may not perform decoding correctly due to collisions. Accordingly, when the autonomous resource selection is applied to reliable communication, a collision avoidance scheme needs to be applied to resource reselection.

In the NR and 5G communication systems, the autonomous resource selection is considered when each UE is capable of performing broadcasting/multicasting, and in eV2X, the autonomous resource selection is also considered for UEs configured to operate in specific mode. Therefore, an appropriate feedback mechanism needs to be designed for the collision avoidance.

The present disclosure proposes a resource reselection method and a feedback mechanism related thereto by considering collisions caused by the hidden node problem in a system supporting the UE autonomous resource selection. In particular, the present disclosure focuses on guaranteeing reliable communication by eliminating the risk of collisions.

Figure 9:
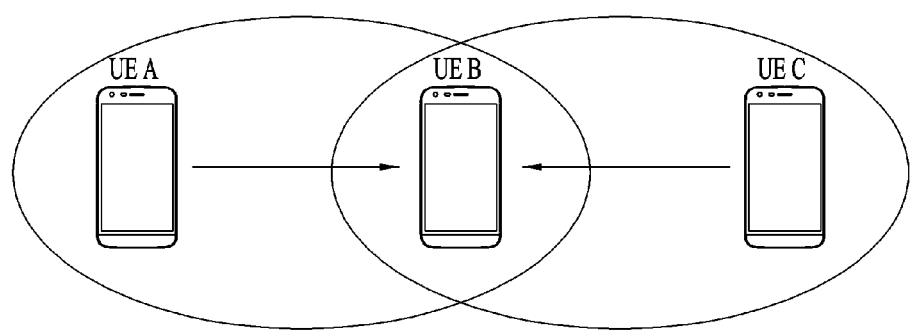
FIG. 9 illustrates communication between UEs.

For example, although UE A and UE C perform sensing in advance for the autonomous resource selection as shown in FIG. 9, there may be no sensed value since UE A and UE C are in the out-of-coverage state, and as a result, a collision there between may occur due to selection of the same resource. In this case, dedicated signaling using a specific channel is required between UE A and UE B and between UE B and UE C as in a reservation scheme, which corresponds to request to send/clear to send (RTS/CTS) used in the prior art. Since multicast transmission is mostly required for the autonomous resource selection rather than dedicated signaling in the eV2X, a feedback mechanism capable of supporting the multicast transmission is required.

Specifically, the present disclosure proposes a feedback mechanism in consideration of resource collision avoidance when the UE autonomous resource selection is applied to a system supporting reliable communication. When the UE autonomous resource selection is applied to the prior art, a UE performs sensing for resource selection to avoid a collision in sensing coverage. Upon obtaining sensing information, the UE may select an available resource in a resource pool and transmit information on the selected resource. Although each UE is designed to perform the autonomous resource selection on unoccupied resources after performing the sensing, there may occur an inevitable collision at a receiving UE if no sensing is allowed as in the hidden node problem. To overcome this problem, the present disclosure proposes a feedback reporting mechanism including information on a collision at a receiver.

In the prior art, resource pools may be broadcast in system information or predefined (or preconfigured) for UEs. In general, frequency-time resources are frequency division multiplexed (FDMed) or time division multiplexed (TDMed) so as to configure channels, each divided into a control region in which control information is transmitted and a data region in which data is transmitted. The control information may include resources for data transmission and related information. UEs may check the location of time-frequency resources on which data is actually transmitted and transmission-related information by decoding the control information in the control region and then decode the data.

The present disclosure describes the application of a feedback mechanism when decoding is disabled due to a collision occurring in a data transmission region although control information is normally decoded and the behavior of a UE receiving feedback information regarding resource reselection.

In the situation shown in FIG. 9, UE A and UE C perform the autonomous resource selection after sensing. Since UE A and UE C are in out-of-coverage regions where no signals are exchanged, UE A and UE C may perform the resource selection while being incapable of detecting their signals. As a result, a resource collision may occur if the same time-frequency resources are selected. If UE B receives signals from UE A and UE C, attempts decode the received signals, and check the collision, feedback information may be considered according to the following standards.

<Feedback Channel and Feedback UE Determination>

Without creating a new channel for feedback, UE B may transmit feedback information by performing autonomous resource selection based on signals received by UE B and sensing results. That is, previously assigned channels may be used for feedback information reporting without assignment of a new channel. If UE B has data to transmit, UE B may select channels for transmitting control information and data and then transmit the feedback information by including the feedback information in the data region as in the transmission mechanism for the UE A and UE C. If UE B has no data to transmit for a predetermined time or the feedback information has a high priority (i.e., high importance), UE B may be allowed to transmit only the feedback information in the data region or transmit the feedback information using the control information. This may be determined when the feedback mechanism is triggered by a BS or preconfigured for UEs.

Whether the receiver UE provides feedback or not may be determined according to the configuration of the BS. The BS may transmit information for triggering the feedback mechanism in system information. Upon receiving the information, UEs may determine whether to respond in the occurrence of a collision. The determination may be made according to the following standards. The BS may configure the following information in the system information.

Threshold (RSSI, RSRP, RSRQ, CQI, RS-SINR, etc.)
   If a UE has received signal strength (or quality) greater than or equal to a threshold, the UE may provide feedback.
UE group indication: offset+modulo m
   If the result of UE ID modulo m is equal to an offset, a corresponding UE may provide feedback.
Whether receiver UE is allowed to make determination
   When the receiver UE has data to transmit, the receiver UE may provide feedback.

<Feedback Content Consideration>

Before describing feedback content, it is assumed that the following information is included in control information considered by UE A or UE C.
Priority information
Frequency-time resources allocated for data
   Frequency resource location with period
   To determine the location of resources for data transmission, a UE may check occupied channels and unoccupied channels by sensing frequency-time resources and perform the autonomous resource selection. The determined frequency resource location may be represented by periods/intervals in the time domain, and the periods may be configured in consideration of priorities.

MCS and retransmission information

Latency budget related to decoding of corresponding message: Assuming that a message is transmitted at X ms, if the latency budget is Y ms, the message needs to be successfully decoded at X+Y ms. How this information is used will be described later.

When the feedback mechanism is modeled, which information needs to be included in feedback information is designed such that unnecessary UE behavior is minimized, and the feedback information is reported on an existing channel. The following content may be potentially included in the feedback information for control decision.

1. Collision Resource Information

Option 1) Frequency resource location

A frequency resource location may be included in the feedback information when it is desirable to transmit information indicating that collisions occurs in some parts of all UEs using a corresponding frequency resource.

Option 2) Frequency resource location+collision interval

A frequency resource location and a collision interval may be included in the feedback information when it is desirable to transmit information indicating that collisions occurs at some time locations of UEs using a corresponding frequency resource.

2. UE behavior information (UE identification information))

Alt 1) No information: when UE identification is disabled

When Option 1 is configured for the collision resource information, it may be desirable to inform all UEs using a corresponding frequency resource that autonomous resource reselection is allowed for retransmission. In this case, no information may be included in the feedback information. If multiple UEs perform transmission on the same frequency resource at the same period, identifying UEs that need to perform the resource reselection based on the feedback information may be impossible. Thus, all UEs using the corresponding resource are configured to perform the resource reselection.

Alt 2) Period included in control information: when UE identification is enabled by periods When the collision interval in Option 2 is configured for the collision resource information, periods may be included to inform UEs receiving the feedback information of the use of previously used frequency-time resources without the resource reselection.

Alt 3) Priority included in control information: when UE identification is enabled by priorities When detecting a collision, receiver UE B may perform the UE identification using the priorities transmitted in the control information and inform whether the autonomous resource reselection is required in order to inform whether the resource reselection is required based on the priorities of transmitting UEs.

Alt 4) Receiver UE determination

If receiver UE B is capable of considering a specific standard where information on the importance of transmitting UEs (i.e., priority information) is reflected when detecting a collision, information on determined (transmitting) UEs may be included according to the standard. For example, whether the resource reselection is required may be informed by considering the periods of the transmitting UEs as the standard for the importance or comparing the strength/quality of received channels. For example, a transmitting UE with a short period may be instructed to perform the resource reselection, and information on a transmitting UE with a relatively long period may be included in the feedback information. Alternatively, information on a UE of which the received channel strength/quality is relatively strong or information on a UE transmitting a strong signal may be included. Transmitting UEs about which information is not included in the feedback information may perform the resource reselection for retransmission.

Alt 5) Latency budget included in control information

When a UE successfully decodes control information, if the UE decodes control signals from two UEs with different latency budgets, the UE may inform a UE with a high latency budget whether the resource reselection is required. The reason for this is that when the reselection is triggered, a UE requires the minimum processing time for triggering the reselection, but it may be different for a UE with a low latency budget to obtain the minimum processing time.

<UE Behavior after Receiving Feedback Information>

Since the above situation is considered to minimize unnecessary behavior when UEs receive feedback information, the UEs may be configured to perform the following behavior based on the feedback information. The 'UE behavior after receiving feedback information' is for a UE receiving the feedback information, for example, UE A or UE C in FIG. 9, i.e., a UE transmitting data to a receiver UE (UE B).

Rule 1: When resource information included in collision resource information is equivalent to resources used by the UE, the UE needs to consider retransmission.

Collision resource information

Option 1) Upon receiving 'frequency resource location' information, the UE may check whether collision resources have been used for previous transmission.

If the collision resources were previously used,

The UE may retransmit data where a collision occurs by performing the autonomous resource reselection. Thereafter, the UE may transmit pending data.

Otherwise,

The UE may assume that the transmission was successful without any collisions and continue the transmission using the currently used resources.

Option 2) Upon receiving 'frequency resource location+collision interval' information, the UE may check whether collision resources have been used for previous transmission.

If the collision resources were previously used,

The UE may retransmit information which was transmitted at the same timing as the collision interval by performing the autonomous resource reselection. Thereafter, the UE may transmit pending data.

Otherwise,

The UE may assume that the transmission was successful without any collisions and continue the transmission using the currently used resources.

UE Behavior Information (UE Identification Information): When the UE determines that there was a collision in resources used for transmission by checking the collision resource information, the UE may perform the following operations by checking the UE behavior information.

If there is no information as in Alt 1),

If the UE is incapable of checking any information in the UE behavior information, the UE may perform the autonomous resource reselection. That is, the UE may assume that all data that the UE has transmitted for a predetermined time period was collided and retransmit all collision data. Thereafter, the UE may start to transmit pending data.

If Alt 2) Period included in control information: when UE identification is enabled by periods, When it is confirmed that period information is present in the UE behavior information, the UE may check whether data has been transmitted in the corresponding period. If the transmission is performed at the same period as that of the period information, the UE may retransmit data where a collision occurs using the currently used frequency-time resources without performing the resource reselection and then continue the data transmission. If the transmission is performed at a different period from that of the period information, the UE may perform the autonomous resource reselection within resource pools except resources where the collision occurs. After retransmitting the data where the collision occurs, the UE may continue transmission of pending data.

If Alt 3) Priority included in control information: when UE identification is enabled by priorities, When it is confirmed that priority information is present in the UE behavior information, the UE may check whether the priority configured in the control information is equal to the priority included in the feedback information from the corresponding priority. If the two priorities are the same, the UE may retransmit data before the occurrence of a collision using the currently used frequency-time resources without performing the resource reselection and then continue the data transmission. If the priority is different from that in the previously transmitted information, the UE may perform the autonomous resource reselection within resource pools except collision resources. After retransmitting the data where the collision occurs, the UE may continue transmission of pending data.

If Alt 4) Receiver UE determination

If UE information included in the UE behavior information is identical to information of the UE, the UE may retransmit data where a collision occurs using the currently used frequency-time resources without performing the resource reselection and then continue transmission of pending data. If the UE information included in the UE behavior information is different from the information of the UE, the UE may perform the autonomous resource reselection within resource pools except collision resources. After retransmitting the data where the collision occurs, the UE may continue the transmission of the pending data.

If Alt 5) Latency budget included in control information: when UE identification is enabled by latency budgets When it is confirmed that latency budget information is present in the UE behavior information, the UE may check whether the corresponding latency budget is equal to the latency budget configured in the control information. If the two latency budgets are the same, the UE may retransmit data before the occurrence of a collision using the currently used frequency-time resources without performing the resource reselection and then continue transmission of pending data. If the latency budget included in the UE behavior information is different from information previously configured or transmitted by the control information, the UE may perform the autonomous resource reselection within resource pools except collision resources. After retransmitting the data where the collision occurs, the UE may continue the transmission of the pending data.

Hereinafter, the embodiments of the present disclosure will be described regarding the above-described proposals.

Embodiment

Feedback Mechanism (Broadcasting Feedback Mechanism Enabling Collision Avoidance)

In this embodiment, it is assumed that control information is normally decoded and a collision occurs in a data transmission region so that decoding is disabled therein.

Step 0: To trigger a feedback mechanism for autonomous resource reselection, a BS may broadcast system information (e.g., SIB 21) to UEs by including the following information in the system information.

Resource pools
Feedback channel information
Channel for transmitting control information or
Channel for transmitting data
Feedback assistant information
Threshold (RSSI, RSRP, RSRQ, CQI, RS-SINR, etc.),
UE group indication: offset+modulo m, or
Whether receiver UE is allowed to make determination The above information may be configured when the BS configures the feedback mechanism or preconfigured for the UEs. Additionally, when a number of UEs participate in communication, the BS may allow flexibility in the management using the feedback assistant information to avoid a situation that multiple UEs transmit feedback information.

Step 1: Upon receiving the system information, a UE may check the information for triggering the feedback mechanism in the system information. If the UE has data to transmit or receives a transmission request from higher layers at the UE, the UE may sense resources in a resource pool and perform autonomous resource selection based on the sensing results. Thereafter, the UE may perform communication over channels for transmitting control information and data.

Step 2: If the UE receives information from other UEs and determine that there is a collision in the data region by decoding control information and data, the (receiver) UE may configure the following feedback content.

Collision resource information

If the UE is incapable of identifying transmitting UEs based on the periods of the UEs or other elements in the control information transmitted from the transmitting UEs after detecting the collision, Option 1 may be applied. If UE identification is disabled or whether resource reselection is required is determined by the receiver UE, Option 2 may be applied.

Option 1) Frequency resource location: The location of a frequency resource where a collision occurs may be indicated.

Option 2) In addition to the frequency resource location, a collision interval may also be indicated.

UE behavior information (UE identification information)

If Option 1 is applied to the collision resource information, the receiver UE may include no information in the UE behavior information by applying Alt 1.

If Option 2 is applied to the collision resource information, the receiver UE may operate as follows.

If the UE identification is enabled by periods confirmed from control information transmitted from UEs where collisions are detected, Alt 2 may be applied so that period information may be indicated by a UE behavior information field. The selection of the period information may depend on UE implementation.

If the UE identification is enabled by priority information confirmed from control information transmitted from UEs where collisions are detected, Alt 3 may be applied so that priority information may be indicated by a UE behavior information field. The selection of the priority information may depend on UE implementation.

If the UE is capable of considering a specific standard where information on the importance of transmitting UEs (i.e., priority information) is reflected when detecting a collision, the UE may indicate a UE that will use the current resources without performing the resource reselection by considering the periods of the transmitting UEs as the standard for the importance or by comparing the strength/quality of received channels. The UE selection may depend on UE implementation.

If the conditions of the feedback assistant information included in the system information are satisfied after the content of the feedback information is configured as described above, the UE may perform the autonomous resource selection and transmit the feedback information over a feedback channel.

Step 3: Each UE receiving the feedback information may operate as follows.

3-1) When Option 1 is applied to the resource collision information and it is confirmed that the UE behavior information follows Alt 1 (no information), The UE may check whether collision resources indicated by the collision resource information have been used for previous transmission.

If the same resources were used,

The UE may perform the autonomous resource reselection. That is, the UE may assume that all data that the UE has transmitted for a predetermined time period was collided and retransmit all data. Thereafter, the UE may initiate data transmission.

Otherwise,

The UE may assume that the transmission was successful without any collisions and continue the transmission using the currently used resources.

3-2) When Option 2 is applied to the collision resource information, 3-2-1) If the UE behavior information is set to Alt 2 (period), The UE may check whether collision resources indicated by the collision resource information have been used for previous transmission.

If the same resources were used,

If it is confirmed that period information is present in the UE behavior information, the UE may check whether data has been transmitted in the corresponding period. If the transmission is performed at the same period as that of the period information, the UE may retransmit data where a collision occurs using the currently used frequency-time resources without performing the resource reselection and then continue the data transmission. If the transmission is performed at a different period from that of the period information, the UE may perform the autonomous resource reselection within resource pools except resources where the collision occurs. After retransmitting the data where the collision occurs, the UE may continue transmission of pending data.

Otherwise,

The UE may assume that the transmission was successful without any collisions and continue the transmission using the currently used resources.

3-2-2) When the UE behavior information is set to Alt 3 (priority),

The UE may check whether collision resources indicated by the collision resource information have been used for previous transmission.

If the same resources were used,

If it is confirmed that priority information is present in the UE behavior information, the UE may check whether the corresponding priority is equal to the priority included in the feedback information. If the two priorities are the same, the UE may retransmit data where a collision occurs using the currently used frequency-time resources without performing the resource reselection and then continue the data transmission. If the priority is different from that in the previously transmitted information, the UE may perform the autonomous resource reselection within resource pools except resources where the collision occurs. After retransmitting information which was transmitted at the same timing as the collision interval, the UE may continue transmission of pending data.

Otherwise,

The UE may assume that the transmission was successful without any collisions and continue the transmission using the currently used resources.

3-2-3) When the UE behavior information is set to Alt 4 (UE receiver determination), The UE may check whether collision resources indicated by the collision resource information have been used for previous transmission.

If the same resources were used,

If UE information included in the UE behavior information is identical to information of the UE, the UE may retransmit data where a collision occurs using the currently used frequency-time resources without performing the resource reselection and then continue transmission of pending data. If the UE information included in the UE behavior information is different from the information of the UE, the UE may perform the autonomous resource reselection within resource pools except collision resources. After retransmitting the data where the collision occurs, the UE may continue the transmission of the pending data.

Otherwise,

The UE may assume that the transmission was successful without any collisions and continue the transmission using the currently used resources.

Figure 10:
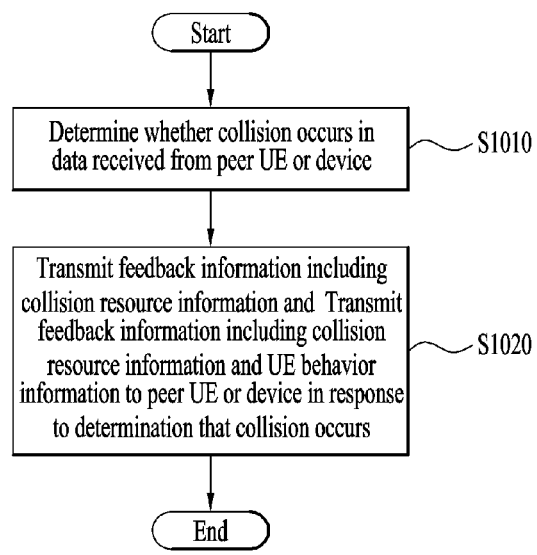
FIGS. 10 and 11 are flowchart illustrating operations according to embodiment(s) of the present disclosure.

FIG. 10 illustrates the operation of a processor chip, a processor, or a UE including or equipped with the same. Hereinafter, the processor chip, the processor, or the UE including or equipped with the same is simply referred to as a "feedback device".

The feedback device may determine whether a collision occurs in data received from a peer UE or device (S1010). The feedback device may transmit feedback information including collision resource information and UE (or device) behavior information to the peer UE or device in response to the determination that the collision occurs (S1020).

The feedback information may be transmitted when the quality or strength of a signal received from the peer UE or device is greater than or equal to a threshold, when the feedback device belongs to a specific UE or device group, or when the feedback device has data to transmit.

The collision resource information may include a frequency resource location or a collision interval. The UE (or device) behavior information may include an indicator indicating all UEs or devices, a period, a priority, a latency budget, or information indicating a specific UE or device. The period and the priority may be respectively selected from among periods and priorities included in control information received by the feedback device, and the specific UE or device may be determined by the feedback device according to a predetermined standard.

The feedback device may receive, from a BS, a feedback trigger configuration including a resource pool for D2D communication, feedback channel information, and feedback assistant information, and the feedback assistant information may include a condition for determining whether the UE performs feedback.

Figure 11:
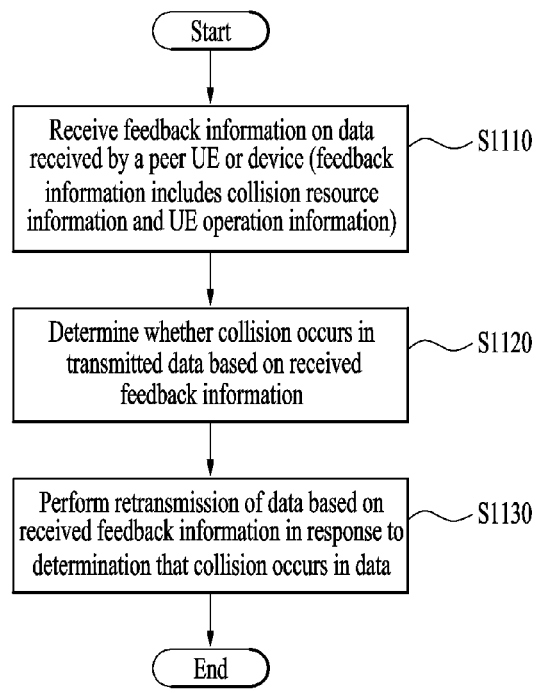

FIG. 11 illustrates the operation of a processor chip, a processor, or a UE including or equipped with the same. Hereinafter, the processor chip, the processor, or the UE including or equipped with the same is simply referred to as a "feedback reception device".

The feedback reception device may receive feedback information on data received by a peer UE or device (S1110). The feedback information may include collision resource information and UE (or device) behavior information. The feedback reception device may determine whether a collision occurs in data transmitted by the feedback reception device based on the received feedback information (S1120). Then, the feedback reception device may perform retransmission of the data based on the received feedback information in response to the determination that the collision occurs in the data (S1130).

When a resource used by the feedback reception device to transmit the data is equivalent to the collision resource information, it may be determined that the collision occurs in the data transmitted by the feedback reception device.

When the received feedback information includes a period, a priority, or a latency budget configured for the feedback reception device through a control signal or information for identifying the feedback reception device, the feedback reception device may retransmit the data on the resource without autonomous resource selection. When the received feedback information includes neither the period, the priority, or the latency budget configured for the feedback reception device through the control signal nor the information for identifying the feedback reception device, the feedback reception device may retransmit the data on a resource based on the autonomous resource selection in a resource pool except the resource.

The collision resource information may include a frequency resource location or a collision interval. The UE (or device) behavior information may include an indicator indicating all UEs or devices, a period, a priority, a latency budget, or information indicating a specific UE or device. The period and the priority may be respectively selected from among periods and priorities included in control information received by the feedback reception device, and the specific UE or device may be determined by the feedback reception device according to a predetermined standard.

Figure 12:
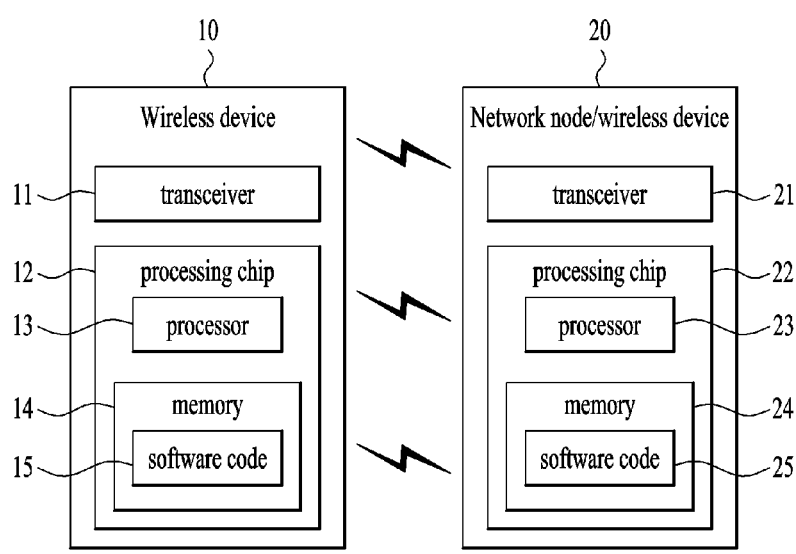
FIG. 12 is a block diagram illustrating devices for implementing the embodiment(s) of the present disclosure.

FIG. 12 is a block diagram illustrating communication between a wireless device 10 and a network node 20. The network node 20 may be replaced with a wireless device, a terminal, or a UE.

In the present specification, the wireless device 10 or the network node 20 may include a transceiver 11 or 21 configured to communicate with one or more other wireless devices, network nodes, and/or other entities in the network. The transceiver 11 or 21 may include one or more transmitters, one or more receivers, and/or one or more communications interfaces.

The transceiver 11 or 21 may include one or more antennas. The antenna may be configured to transmit a signal processed by the transmitter 11 or 21 to the outside under the control of a processing chip 12 or 22 or deliver a radio signal received from the outside to the processing chip 12 or 22. The antenna may be referred to as an antenna port. Each antenna may correspond to one physical antenna or may be configured by a combination of two or more physical antenna elements. A signal transmitted on each antenna may not be decomposed further at the wireless device 10 or the network node 20. An RS transmitted in relation to a corresponding antenna defines an antenna observed from the perspective of the wireless device 10 or the network node 20. Thus, the RS may allow the wireless device 10 or the network node 20 to estimate the channel for the antenna regardless of whether the channel is a single radio channel from one physical antenna or a composite channel from a plurality of physical antenna elements including the antenna. That is, an antenna is defined such that a channel for carrying a symbol on the antenna is derived from a channel for carrying another symbol on the same antenna. When a transceiver supports multi-input multi-output (MIMO) transmission where data is transmitted and received using a plurality of antennas, the transceiver may be connected to two or more antennas.

In the present disclosure, the transceiver 11 or 21 may be configured to support reception beamforming and transmission beamforming. For example, the transceiver 11 or 21 may be configured to perform the functions illustrated above with reference to FIGS. 5 to 8.

The wireless device 10 or the network node 20 may include the processor chip 12 or 22. The processor chip 12 or 22 may include at least one processor such as a processor 13 or 23 and at least one memory device such as a memory 14 or 24.

The processing chip 12 or 22 may be configured to control at least one of the methods and/or processes described in the present specification. In other words, the processor chip 12 or 22 may be configured to implement at least one of the embodiments disclosed in the present specification.

The processor 13 or 23 may include at least one processor configured to perform the functions of the wireless device 10 or the network node 20 described above in the present specification.

For example, the at least one process may be configured to control the transceiver 11 or 21 in FIG. 12 to transmit and receive information.

The processor 13 or 23 included in the processing chip 12 or 22 may be configured to apply predetermined coding and modulation to a signal and/or data to be transmitted to the outside of the wireless device 10 or the network node 20 and transmit the signal and/or data to the transceiver 11 or 21. For example, the processor 13 or 23 may be configured to convert a data sequence to be transmitted into K layers through demultiplexing, channel coding, scrambling, and modulation. The encoded data sequence may be referred to as a codeword and be equivalent to a transport block, which is a data block provided by the MAC layer. One transport block (TB) is encoded as one codeword, and each codeword is transmitted to a receiver in the form of one or more layers. For frequency-up transformation, the transceiver 11 or 21 may include an oscillator. The transceiver 11 or 21 may include Nt transmission antennas (where Nt is a positive integer greater than or equal to 1).

The processing chip 12 or 22 may include the memory 14 or 24 configured to store data, programmable software code, and/or other information for implementing the embodiments described in the present specification.

In other words, the memory 14 or 24 may be configured to store software code 15 or 25 including commands for allowing the processor 13 or 23 to perform some or all of the processes controlled by the processor 13 or 23 of FIG. 12 or implementing the embodiments described above with reference to FIGS. 1 to 11 when being executed by the at least one processor such as the processor 13 or 23.

Specifically, the processing chip 12 of the wireless device 10 according to an embodiment of the present disclosure may be configured to determine whether a collision occurs in data received from a peer UE or device. The processing chip may be configured to transmit feedback information including collision resource information and UE (or device) behavior information to the peer UE or device in response to the determination that the collision occurs The feedback information may be transmitted when the quality or strength of a signal received from the peer UE or device is greater than or equal to a threshold, when the processing chip or a UE or device including the processing chip belongs to a specific UE or device group, or when the processing chip or the UE or device including the processing chip has data to transmit.

The collision resource information may include a frequency resource location or a collision interval. The UE (or device) behavior information may include an indicator indicating all UEs or devices, a period, a priority, a latency budget, or information indicating a specific UE or device. The period and the priority may be respectively selected from among periods and priorities included in control information received by the processing chip or the UE or device including the processing chip, and the specific UE or device may be determined by the processing chip or the UE or device including the processing chip according to a predetermined standard.

The processing chip may be configured to receive, from a BS, a feedback trigger configuration including a resource pool for D2D communication, feedback channel information, and feedback assistant information, and the feedback assistant information may include a condition for determining whether the processing chip or the UE or device including the processing chip performs feedback.

The processing chip 22 of the network node 20, which may be replaced with a wireless device, a terminal, or a UE, may be configured to receive feedback information on data received by a peer processing chip or a peer UE or device including the peer processing chip. The feedback information may include collision resource information and UE (or device) behavior information. The processing chip may be configured to determine, based on the received feedback information, whether a collision occurs in data transmitted by the processing chip or the peer UE or device including the peer processing chip. The processing chip may be configured to perform retransmission of the data based on the received feedback information in response to the determination that the collision occurs in the data.

When a resource used by the processing chip or the peer UE or device including the peer processing chip to transmit the data is equivalent to the collision resource information, it may be determined that the collision occurs in the data transmitted by the processing chip or the peer UE or device including the peer processing chip.

When the received feedback information includes a period, a priority, or a latency budget configured for the processing chip or the peer UE or device including the peer processing chip through a control signal or information for identifying the processing chip or the peer UE or device including the peer processing chip, the processing chip or the peer UE or device including the peer processing chip may retransmit the data on the resource without autonomous resource selection. When the received feedback information includes neither the period, the priority, or the latency budget configured for the processing chip or the peer UE or device including the peer processing chip through the control signal nor the information for identifying the processing chip or the peer UE or device including the peer processing chip, the processing chip or the peer UE or device including the peer processing chip may retransmit the data on a resource based on the autonomous resource selection in a resource pool except the resource.

The collision resource information may include a frequency resource location or a collision interval. The UE (or device) behavior information may include an indicator indicating all UEs or devices, a period, a priority, a latency budget, or information indicating a specific UE or device. The period and the priority may be respectively selected from among periods and priorities included in control information received by the processing chip or the peer UE or device including the peer processing chip, and the specific UE or device may be determined by the feedback reception device according to a predetermined standard.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

In this document, a specific operation described as performed by the BS may be performed by an upper node of the BS. That is, it is apparent that various operations for communication with the UE may be performed by the BS or other network nodes rather than the BS in a network including a plurality of network nodes including the BS. The term 'base station' may be replaced with the term 'fixed station', 'Node B', 'eNode B (eNB)', 'next generation eNB (ng-eNB)', 'next generation Node B (gNB)', 'access point (AP)', etc.

The embodiments of the present disclosure may be achieved by various means, for example, hardware, firmware, software, or any combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

The detailed description of the exemplary embodiments of the present disclosure has been given to enable those skilled in the art to implement and practice the present disclosure. Although the present disclosure has been described with reference to the exemplary embodiments, those skilled in the art will appreciate that various modifications and variations can be made in the present disclosure without departing from the spirit or scope of the present disclosure described in the appended claims. For example, those skilled in the art may use each construction described in the above embodiments in combination with each other. Accordingly, the present disclosure should not be limited to the specific embodiments described herein, but should be accorded the broadest scope consistent with the principles and novel features disclosed herein.

INDUSTRIAL APPLICABILITY

The present disclosure may be used for a wireless communication device such as a UE, a relay, a BS, etc.

The invention claimed is:

1. A method for device-to-device (D2D) communication based on broadcast or multicast transmission in a wireless communication system, the method performed by a first user equipment (UE) and the method comprising:
determining whether a collision occurs with data received from a peer UE; and
transmitting feedback information comprising collision resource information and UE behavior information to the peer UE in response to a determination that a collision occurred,
wherein the data is re-received on a resource without autonomous resource selection based on (i) a period, a priority, or a latency budget configured for the peer UE through a control signal being included in the feedback information or (ii) information for identifying the peer UE being included in the feedback information, and
wherein the data is re-received on a resource based on autonomous resource selection from a resource pool, except a collision resource in which the collision occurred, based on (i) the period, the priority, or the latency budget configured for the peer UE through the control signal not being included in the feedback information or (ii) the information for identifying the peer UE not being included in the feedback information.

2. The method of claim 1, wherein the feedback information is transmitted based on:
quality or strength of a signal received from the peer UE being greater than or equal to a threshold;
the first UE belonging to a specific UE group; or
the first UE having data to transmit.

3. The method of claim 1, wherein the collision resource information comprises a frequency resource location or a collision interval.

4. The method of claim 1, further comprising receiving, from a base station, a feedback trigger configuration comprising the resource pool for the D2D communication, feedback channel information, and feedback assistant information, and wherein the feedback assistant information comprises a condition for determining whether the first UE is configured to perform the feedback.

5. A method for device-to-device (D2D) communication based on broadcast or multicast transmission in a wireless communication system, the method performed by a first user equipment (UE) and the method comprising:
receiving feedback information regarding data received by a peer UE, wherein the feedback information comprises collision resource information and UE behavior information;
determining whether a collision occurs with data transmitted by the first UE based on the received feedback information;
performing retransmission of the data transmitted by the first UE based on the received feedback information in response to a determination that a collision occurred with the data; and
based on (i) a period, a priority, or a latency budget configured for the first UE through a control signal being included in the feedback information or (ii) information for identifying the first UE being included in the feedback information, retransmitting the data transmitted by the first UE on a resource without autonomous resource selection; and
based on (i) the period, the priority, or the latency budget configured for the first UE through the control signal not being included in the received feedback information or (ii) the information for identifying the first UE not being included in the feedback information, retransmitting the data transmitted by the first UE on a resource based on autonomous resource selection from a resource pool, except a collision resource in which the collision occurred.

6. The method of claim 5, wherein based on a resource used by the first UE to transmit the data identified by the collision resource information, it is determined that the collision occurs with the data transmitted by the first UE.

7. The method of claim 5, wherein the collision resource information comprises a frequency resource location or a collision interval.

8. A user equipment (UE) configured to perform feedback for device-to-device (D2D) communication based on broadcast or multicast transmission in a wireless communication system, the UE comprising:
a memory; and
at least one processor operatively coupled to the memory, wherein the at least one processor is configured to:
determine whether a collision occurs in data received from a peer UE; and
transmit feedback information comprising collision resource information and UE behavior information to the peer UE in response to a determination that the collision occurred,
wherein the data is re-received on a resource without autonomous resource selection based on (i) a period, a priority, or a latency budget configured for the peer UE through a control signal being included in the feedback information or (ii) information for identifying the peer UE being included in the feedback information, and
wherein the data is re-received on a resource based on autonomous resource selection from a resource pool, except a collision resource in which the collision occurred, based on (i) the period, the priority, or the latency budget configured for the peer UE through the control signal not being included in the feedback information or (ii) the information for identifying the peer UE not being included in the feedback information.

9. The UE of claim 8, wherein the feedback information is transmitted based on:
quality or strength of a signal received from the peer UE being greater than or equal to a threshold;

the UE belonging to a specific UE group; or the UE having data to transmit.

10. The UE of claim 8, wherein the collision resource information comprises a frequency resource location or a collision interval.

11. The UE of claim 8, wherein the at least one processor is further configured to receive, from a base station, a feedback trigger configuration comprising the resource pool for the D2D communication, feedback channel information, and feedback assistant information, and wherein the feedback assistant information comprises a condition for determining whether the UE is configured to perform the feedback.

12. A first user equipment (UE) configured to receive feedback for device-to-device (D2D) communication based on broadcast or multicast transmission in a wireless communication system, the first UE comprising:

a memory; and at least one processor operatively coupled to the memory, wherein the at least one processor is configured to:

receive feedback information regarding data received by a peer UE, wherein the feedback information comprises collision resource information and UE behavior information;

determine whether a collision occurs in data transmitted by the first UE based on the received feedback information perform retransmission of the data transmitted by the first UE based on the received feedback information in response to a determination that the collision occurred with; and based on (i) a period, a priority, or a latency budget configured for the first UE through a control signal being included in the feedback information or (ii) information for identifying the first UE being included in the feedback information, retransmit the data transmitted by the first UE on a resource without autonomous resource selection; and based on (i) the period, the priority, or the latency budget configured for the first UE through the control signal not being included in the received feedback information or (ii) the information for identifying the first UE not being included in the feedback information, retransmit the data transmitted by the first UE on a resource based on autonomous resource selection from a resource pool except a collision resource in which the collision occurred.

13. The first UE of claim 12, wherein based on a resource used by the first UE to transmit the data identified by the collision resource information, it is determined that the collision occurs with the data transmitted by the first UE.

14. The first UE of claim 12, wherein the collision resource information comprises a frequency resource location or a collision interval.

* * * * *